United States Patent [19]
Schwartz et al.

[11] Patent Number: 4,939,641
[45] Date of Patent: Jul. 3, 1990

[54] MULTI-PROCESSOR SYSTEM WITH CACHE MEMORIES

[75] Inventors: Martin J. Schwartz, Worcester; Robert D. Becker, Shirley, both of Mass.

[73] Assignee: Wang Laboratories, Inc., Lowell, Mass.

[21] Appl. No.: 213,556

[22] Filed: Jun. 30, 1988

[51] Int. Cl.$^5$ ............................................. G06E 13/00
[52] U.S. Cl. ............................... 364/200; 364/243.4; 364/243.41; 364/259.2
[58] Field of Search ... 364/200 Ms File, 900 MS File

[56] References Cited

U.S. PATENT DOCUMENTS

| | | | |
|---|---|---|---|
| 3,735,360 | 5/1973 | Anderson et al. | 364/200 |
| 3,761,883 | 9/1973 | Alvarez et al. | 364/200 |
| 3,845,474 | 10/1974 | Lange et al. | 364/200 |
| 3,967,247 | 6/1976 | Anderson et al. | 364/200 |
| 4,167,782 | 9/1979 | Joyce et al. | 364/200 |
| 4,394,732 | 7/1983 | Swenson | 364/200 |
| 4,442,487 | 4/1984 | Fletcher et al. | 364/200 |
| 4,464,712 | 8/1984 | Fletcher | 364/200 |
| 4,527,238 | 7/1985 | Ryan et al. | 364/200 |
| 4,551,799 | 11/1985 | Ryan et al. | 364/200 |
| 4,602,368 | 6/1986 | Circello et al. | 364/200 |
| 4,675,811 | 6/1987 | Kishi et al. | 364/200 |
| 4,685,082 | 8/1987 | Cheung et al. | 365/49 |
| 4,811,209 | 3/1989 | Rubenstein | 364/200 |

OTHER PUBLICATIONS

Censier & Feautrier, A New Solution to Coherence Problems in Multicache Systems, IEEE Transactions on Computers, vol. C-27, No. 12, 9/78, pp. 1112-1118.
"Cache Memories", by Alan Jay Smith, Computer Surveys, vol. 14, No. 3, Sep. 1982.
"16-Kilobyte Cache/Memory Management System", Motorola SemiConductor Technical Data Brochure.

Primary Examiner—David Y. Eng
Attorney, Agent, or Firm—Michael H. Shanahan

[57] ABSTRACT

A system is described wherein a CPU, a main memory means and a bus means are provided. Cache memory means is employed to couple the CPU to the bus means and is further provided with means to indicate the status of a data unit stored within the cache memory means. One status indication tells whether the contents of a storage position have been modified since those contents were received from main memory and another indicates whether the contents of the storage position may be present elsewhere memory means. Control means are provided to assure that when a data unit from a CPU is received and stored in the CPU's associated cache memory means, which data unit is indicated as being also stored in a cache memory means associated with another CPU, such CPU data unit is also written into main memory means. During that process, other cache memory means monitor the bus means and update its corresponding data unit. Bus monitor means are provided and monitor all writes to main memory and reads from main memory to aid in the assurance of system-wide data integrity.

16 Claims, 10 Drawing Sheets

ADDRESS FORMAT

DATA FORMAT

MULTI-PROCESSOR SYSTEM WITH CACHE MEMORIES

I. FIELD OF THE INVENTION

This invention relates to multi-processor computing systems which employ cache memories and more particularly to means and methods for maintaining data integrity therein.

BACKGROUND OF THE INVENTION

The use of high speed, small capacity cache memory systems is well known. While there are a variety of cache memory systems, several of the better known are termed "write through" caches and "write back" caches. In a write through cache, data is written into main memory at the same time it is written into the cache. Thus, the cache always contains identical data to that stored in main memory and data integrity (coherency) is maintained throughout the system. The problem with write through architecture is that it creates an excessive amount of bus traffic, in that a write to main memory occurs every time there is a write to the write through cache. A positive aspect of this architecture is that it is always known where the most updated data resides, i.e., everywhere.

In an architecture employing a write back cache, the amount of traffic on the bus is significantly reduced. Initially, data is written into the write back cache from main memory and is then used by the central processing unit (CPU) for operations. When the CPU writes the data back into the cache and assuming it has been modified, a "dirty" bit is set to indicate that the data is now unique to that cache and is different from that which resides in main memory. In such a cache, in general, no immediate effort is made to write the revised data into the main memory to maintain data integrity. Obviously then, it is the dirty bit which is critical to the maintenance of data coherence. So long as a write back cache is utilized with only one processor, data management is straight forward. However, when more than one central processor uses the same main memory, data management problems multiply.

In such systems, there is often more than one cache memory present. Each entry position in a cache is provided with a valid/invalid bit. If a CPU sees that another cache is writing to memory and finds that its cache contains an identical data address, it invalidates its own cache entry rather than updating it. Thus, when a CPU accesses its cache at that particular data address, it finds an invalid entry and is redirected to main memory, a time consuming process.

It is therefore an object of this invention to maintain data integrity in a multi-processor/cache environment without requiring excessive accesses to main memory.

It is another object of this invention to enable a number of CPU's to access data via their associated cache memories with each processor knowing that it is always accessing the most updated data.

It is still another object of this invention to provide a multi-processor system employing write back caches wherein main memory accesses are minimized while simultaneously maintaining data integrity throughout the system.

It is a further object of this invention to provide a cache memory system wherein the use of valid/invalid data indicators are avoided.

SUMMARY OF THE INVENTION

A multi-processing system is described wherein at least two CPU's, a main memory means and a bus means are provided. Cache memory means are employed to couple each CPU to the bus means and are further provided with means to indicate the status of a data unit stored within the cache memory means. One status indication tells whether the contents of a storage position have been modified since those contents were received from main memory and another indicates whether the contents of the storage position may be present in another cache memory means. Control means are provided to assure that when a data unit from a CPU is received and stored in the CPU's associated cache memory means, which data unit is indicated as being also stored in a cache memory means associated with another CPU, such CPU data unit is also written into main memory means. During that process, other cache memory means monitors the bus means and updates its corresponding data unit. Bus monitor means are provided for each cache memory means and monitor all writes to main memory and reads from main memory to aid in the assurance of system-wide data integrity.

DETAILED DESCRIPTION OF THE INVENTION

Figure 1:
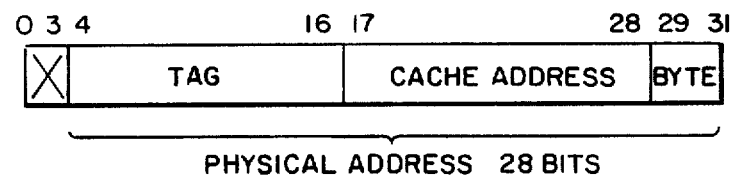
FIG. 1 shows both the address and data formats for the data processing system embodying the invention.
Figure 1:
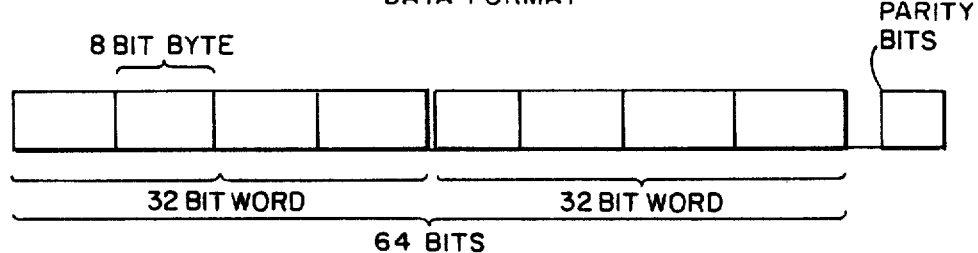

The data processing system of this invention employs address and data formats shown in FIG. 1. A byte comprises 8 bits and a word 4 bytes. Each position in memory is adapted to store two words ("double word") and is addressable at the byte level. Any byte may be individually addressed, read and/or written as can any combination of bytes, words and double words. Normally, unless otherwise instructed, data transfers in this system comprise double words.

With respect to address formats, 28 bits are actively used and comprise a physical address in main memory where a subset of data (e.g. a byte) is to be found. Portions of the physical address are employed to access and identify positions within a write-back cache memory.

Each cache uses 12 bits of the physical address, (i.e., bits 4–16) to identify a data word and those 12 bits are called the tag. Another portion of the physical address, i.e., bits 17–28, is employed to provide an address to a storage position within the cache memory (called the cache address). Thus, while the cache address references a storage position within the cache memory, the tag identifies data actually stored at that storage position.

An access into a cache memory commences with the arrival of a physical address from the CPU. The cache employs the cache address to access one of its memory positions. Subsequently, the tag portion of the received physical address is compared with the tag portion of the data stored at the cache address to determine if there is a match, thus indicating that a "hit" has occurred and the proper data to be either accessed, written over or otherwise altered or utilized is the data actually designated by the physical address. If no match is found, (i.e., a "miss") the typical response of the system is to generate a read request to main memory for the requested data.

As above stated, the data format, is two words in length, with each word being 32 bits and comprising eight bit bytes. There are also parity bits associated therewith but these are not relevant to a discussion of this invention.

It should be kept in mind during the following description, that the invention maintains data integrity by assuring that cache data is always the most up-to-date in the system. Thus, there never is a "valid" or "invalid" indication with respect to any cache data as it is always assured that if data is provided by a cache, that it invariably is valid (i.e. most up-to-date).

By contrast, cache systems which employ valid and invalid indicators unnecessarily multiply the number of cache misses which occur when an invalid data unit is addressed. In such systems, a valid data unit is fetched, placed in the cache and then provided to the requestor. This invention avoids those unnecessary memory cycles; avoids the need for any directory or other listing of valid and invalid data and avoids any requirement that its memory controller keep records of cache operations.

In the cache memories of this invention, indications are associated with each cache data word of its state of modification (if any) since being accessed from main memory, (e.g. "dirty" or "not dirty") and whether it also may reside in another cache store (e.g. "shared" or "not shared"). These indications enable the system to continuously update the cache data words and assures that they are updated when they are called for. Even in the case where a cache store is found not to have the requested data, if such data is resident in another cache store, provisions are made for its immediate transfer to the requested cache store.

The invention further avoids the necessity for the provision of special procedures when more than one CPU wishes to simultaneously modify bytes in a single word. This invention accomplishes such modifications during the normal course of its operations.

Since, by definition, data in the caches of this system is the most up-to-date, when system operation is initiated, each of the caches must be filled with data. This is accomplished by arbitrarily selecting data from main memory and writing it into each cache store, it being remembered, that at system start-up, main memory data is considered most up-to-date. The system then commences further operations as described hereinafter.

Figure 2A:
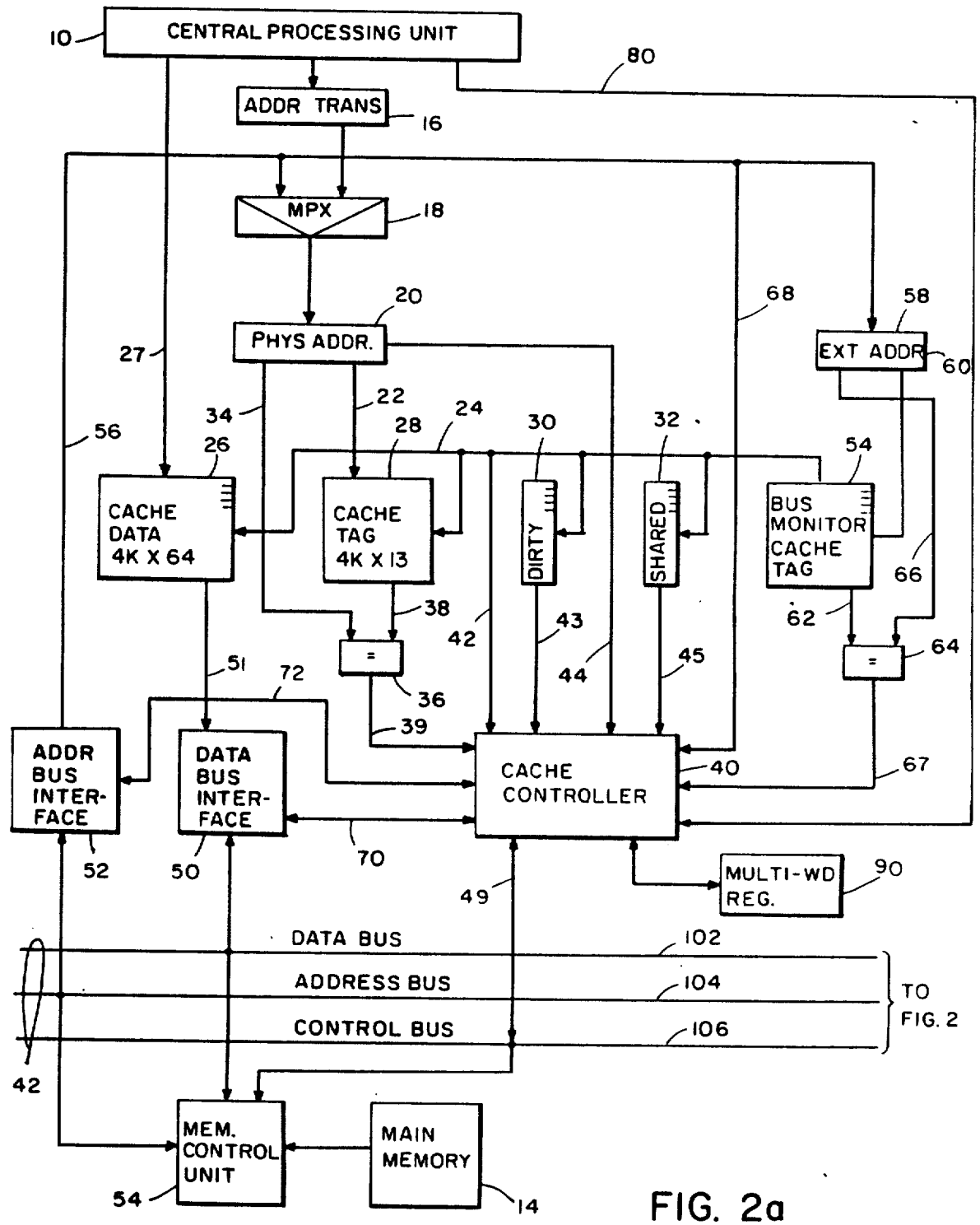
FIGS. 2a and 2b, in combination, illustrate a high level block diagram of the invention.
Figure 2B:
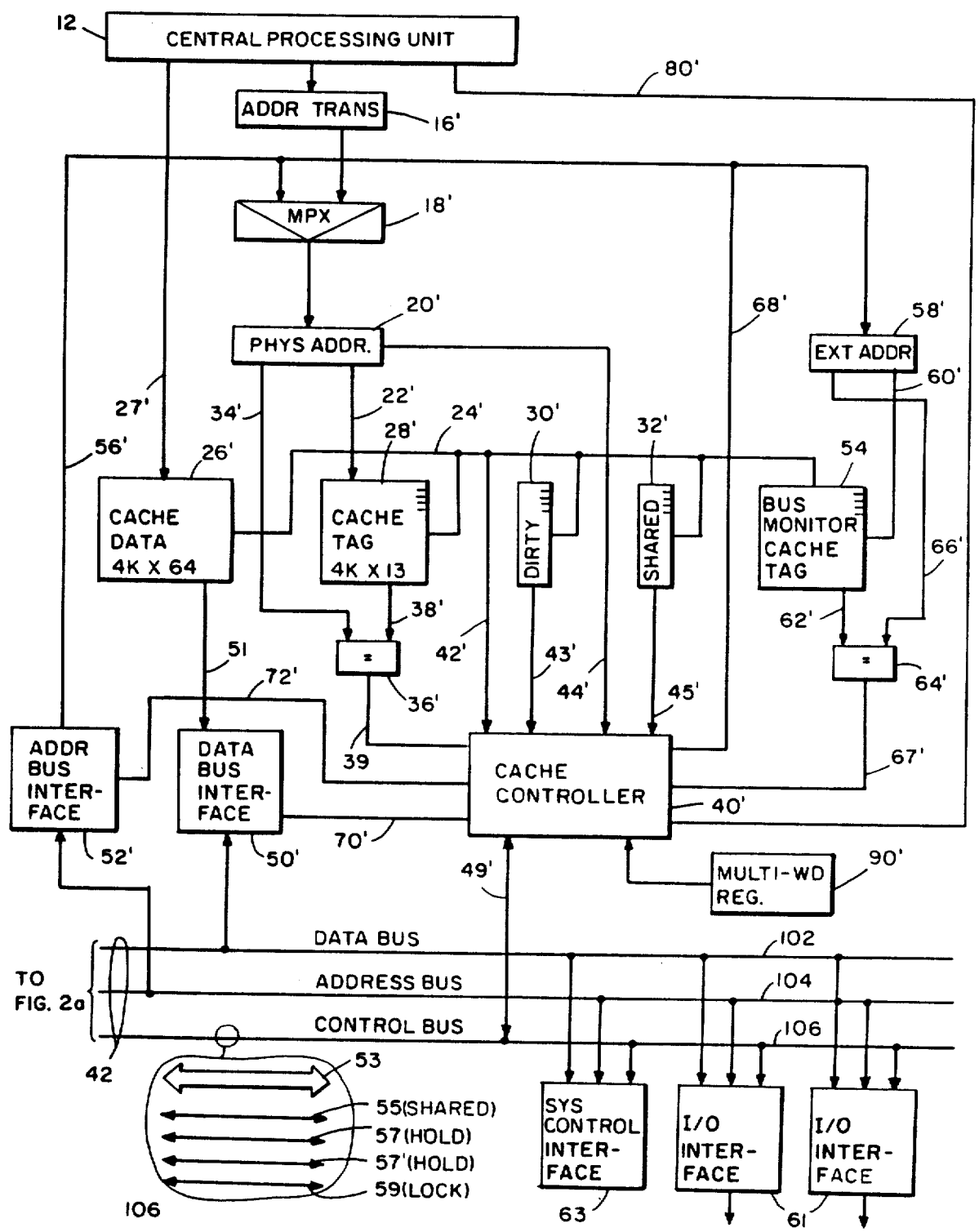

Turning to FIG. 2, a high level block diagram is shown of a multi processor system that includes at least two CPU's 10 and 12. Each CPU typically operates with a virtual addressing system; however, when internal CPU and memory operations are carried out, the virtual addresses are converted to physical addresses which indicate the actual address positions within main memory 14 where the data designated by the address is stored. The address conversion occurs in address translators 16 and 16' with the resulting physical address being passed via multiplexors 18 and 18' to physical address registers 20 and 20'. As each of the CPU's, along with their associated cache memory systems, are identical, CPU 10 will hereinafter be described in detail with it being understood that CPU 12 is identical and is numbered in an identical manner with prime numbers.

The portion of the physical address resident in physical address register 20 which corresponds to the cache address (i.e. bits 17–28) is fed via cable 22 to cache bus 24. Also connected to cache bus 24 is cache data store 26, cache tag store 28, "dirty" bit store 30, "shared" bit store 32 and bus monitor cache tag store 54. A cable 27 provides for direct entry of data from CPU 10 to cache data store 26. Cache data store 26 is typically a 32K byte memory that is 4K lines deep by 64 bits wide (8 bytes). Each line of this cache stores a double word. Cache tag store 28 is typically 4K lines deep by 13 bits wide and stores the tag portion of the physical address, which tag defines the address where the corresponding data is stored in cache data store 26. It should be remembered that each double word of data has associated with it a physical address which is indicative of the position in main memory 14 where that double word is stored. Thus, each line of cache tag store 28 corresponds in position to a data storage address in cache data store 26 and contains the tag portion of the physical address associated with the data stored at such cache data store address.

Dirty bit register 30 and shared bit register 32 are each also 4K lines deep. A "1" bit on any line of dirty bit register 30 indicates that data in data in the corresponding line of cache data store 26 is more up to date than data in the corresponding storage location in main memory 14. A "0" setting on any line of dirty bit register 30 indicates that the corresponding entry in cache data store 26 is the same as that appearing at that location in main memory (with one exception to be hereinafter described). A bit set to 1 on any line of shared bit register 32 indicates that another cache in the system might contain the same entry. A bit set to 0 on any line of shared bit register 32 indicates that no other cache has the same entry.

Referring back to physical address register 28, cable 34 accesses the tag portion (bits 4–16) of the physical address and presents it to comparator 36. Cable 38 from cache tag store 28 also presents to comparator 36 a selected tag stored therein. If a comparison occurs, indicating that the tags are identical (a hit), a signal is sent via line 39 to cache controller 40.

While cache controller 40 and other operational and control entities, are, for illustration purposes, shown as independent entities, it should be understood that their functions, to be hereinafter described, may be incorporated into a CPU and not appear as totally independent entities.

Cables 42 and 44 provide to cache controller 40 the cache address bits from cache bus 24 and the complete physical address from register 20, respectively. Lines 43 and 45 respectively provide the means for setting and reading out to cache controller 40, the dirty and shared bits respectively Cache controller 40 also provides signals via cable 42 to cache bus 24 which control the read in and read out of data from cache data store 26, cache tag store 28, dirty bit register 30, shared bit register 32 and bus monitor cache tag store 54.

Communications between the main elements of the system shown in FIG. 2 occur on system bus 42. In actuality, system bus 42 is comprised of 3 separate bus systems, i.e., data bus 102, address bus 104 and control bus 106. Control bus 106 is in turn comprised of main control lines 53, shared line 55 (which is connected to all cache controllers), bus lock line 59 (which is monitored by all units connected to system bus 42) and hold lines 57 and 57'. Hold line 57 emanates from cache controller 40 and hold line 57' emanates from cache controller 40. Both hold lines 57 and 57' are monitored by all units connected to system bus 42.

Each hold line 57, 57' and lock line 59 performs somewhat similar functions (i.e. exclusion of others from the system bus). When a cache controller asserts its hold line, all other potential users of the system bus are kept off the bus until the hold line is released. For instance (as will hereinafter be described in detail), it will sometimes be the case that a cache controller, in monitoring the system bus 42, will detect that a more recent version of the data being returned to another requestor is also present in its own cache store. In such case the monitoring cache controller will set its hold line which indicates to the data requestor, that more data may be coming and not to release its connection to the system bus. Thus the hold line effectively prevents any subsequent independent transaction from occurring until the data requestor is assured of having received the most updated data available.

With respect to bus lock line 59, an entity connected to the bus must request access to it and is granted that access only after the system assures that no other entity having higher priority is queued up and waiting with a similar request. Once an entity is granted access to bus lock line 59 and asserts it, only the asserting entity and memory control unit 54 have access to the system bus. Thus when the asserting entity issues a read request, memory control unit 54 can respond without fear of any other entity having an opportunity to access the main memory and to change the requested data. When the particular operation or operations are concluded, bus lock line 59 is released and becomes available to any other requesting entity.

Data bus 102 carries data between all main subsystems (e.g. between the cache memory systems and main memory 14). Each cache memory is provided with a data bus interface 50 which provides access to and from data bus 102. In a like manner, address bus 104 is accessed by each cache memory via an address bus interface 52. Control bus 106 is connected via cable 49 to cache controller 40 and provides the necessary traffic pathways for various system control signals. Each of busses 102, 104 and 106 is also connected to memory control unit 54 which manages all main memory operations. Each of busses 102, 104 and 106 further connected to I/O interfaces 61 which control all transfers between connected input/output devices and the various system busses; and to system control interface unit 63 which provides system initialization control and diagnostics.

An important portion of each cache memory for assuring data integrity, is bus monitor cache tag store 54. Bus monitor cache tag store 54 is identical in structure to cache tag store 28 and contains an identical set of tags as are contained in cache tag store 28.

When address bus interface 52 monitors a physical address on address bus 104, it transmits that address via cable 56 to external address register 58. Output cable 60 from external address register 58 carries the cache address portion of the monitored physical address and causes the memory line corresponding thereto in bus monitor cache tag store 54 to be read out via cable 62 to comparator 64. The other input to comparator 64 occurs on cable 66 and is the tag portion of the physical address stored in external address register 58. An equivalency indication from comparator 64 is fed via line 67 to cache controller 40. Another input to cache controller 40 is provided via cables 56 and 68 which carry the full physical address monitored by address bus interface 52. Cache controller 40 controls the operations of address bus interface 52 and data bus interface 50 via signals emplaced on lines 70 and 72. Data bus interface 50 operates in much the same manner as address bus interface 52, however it captures data appearing on data bus 102 and provides it upon command via cable 51 to cache data store 26.

Figure 3:
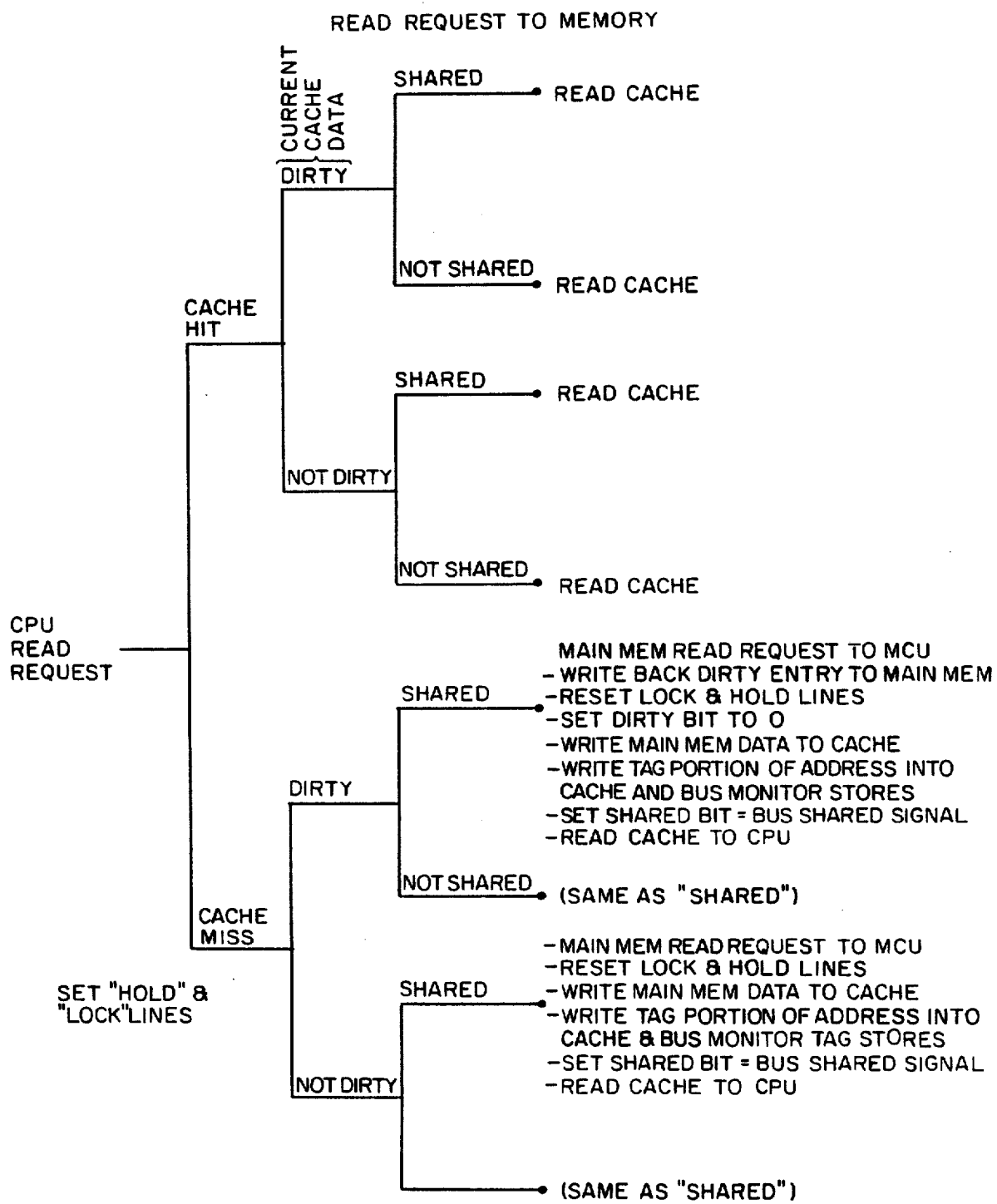
FIG. 3 is a decision tree indicating the sequence of events which occur during a CPU read request to memory.

Referring now to FIG. 3 (in conjunction with FIG. 2), a decision tree is illustrated showing operations which occur when CPU 10 issues a read request to main memory 14. Under such circumstances, CPU 10 issues its read request via cable 80 to cache controller 40. Previously, the physical address of the data requested to be read from memory was inserted by CPU 10 into physical address register 20. Cache controller 40 then causes the tag portion of physical address register 20 to be compared against the tags stored in cache tag register 28. If a match is found by comparator 36, a signal is provided by line 38 to cache controller 40 indicating "hit". If cache controller 40 detects no "hit" signal within a predetermined time period, it assumes that a "miss" signal has been generated and that corresponding data is not present in cache data store 26. Similarly, the cache address residing in physical address register 20 causes the dirty and shared status bits to be read out via lines 43 and 45 to cache controller 40. Thusly, cache controller 40 knows whether the data being sought is present in cache data store 26 (hit or miss); whether it is dirty or not; and whether it is shared or not.

As shown in FIG. 3, the top four branches of the decision tree all assume that the data being sought is present in cache data store 26. In such case, it is irrelevant whether it is dirty or not, or shared or not shared and cache controller 40 causes cache data store 26 to read out the requested data via cable 27 to CPU 10.

If, on the other hand, cache controller 40 detects that the requested data is not in cache data store 26 (a miss), and that the data stored at the addressed location in cache data store 26 is both dirty and shared, a series of operations are then undertaken. Initially, cache controller 40 issues a main memory read request to memory control unit 54 indicating data is required from the physical address location stored in physical address register 20. Memory control unit 54 then accesses the requested data from the physical address in main memory 14 and provides it via data bus 102 to data bus interface 50. Before that data may be written into cache data store 26, the unwanted data presently stored at that address within cache data store 26 must be saved. Since the unwanted data is "dirty", it is written back into main memory 14 via cable 51 and data bus interface 50. In that way, the data in main memory 14 is updated to correspond to the unwanted dirty data presently residing in the addressed position of cache data store 26. The dirty bit corresponding to that address is then reset to zero and data bus interface 50 is commanded to write the requested data (now held in data bus interface 50) into cache data store 26 at the cache address indicated by physical address 20. Simultaneously, the tag portion of the requested data is entered into cache tag store 28 and bus monitor cache tag store 54. The shared bit corresponding thereto in shared bit store 32 is then updated in accordance with the "bus shared" signal appearing on control bus 106. (the operation of which will be described hereinbelow.) Subsequently, the data newly entered into cache data store 26 is read back to CPU 10 via cable 27.

Each cache controller continuously monitors system bus 42 for two types of operations: (a) a data write to main memory 14 and (b) a data return from main memory 14 to fill a read request. The monitoring is independent of where the read or write request originates (e.g. a cache/CPU, a system bus interface, a system control interface, an I/O interface). It is this continuous monitoring which greatly assists the system to maintain data integrity.

Returning to FIG. 2, if it is assumed that cache controller 40 issues a data read signal onto control bus 106, that signal is sensed by cache controller 40' which instructs address bus interface 52, to latch the address to be subsequently placed onto address bus 46. Address bus interface 52' latches the requested physical address from the address bus and places it into external address register 58'. There, its tag portion is utilized to determine if bus monitor cache tag store 54' has a tag which compares with the address tag portion just inserted into external address register 58'. If a compare occurs, cache controller 40' sets a "hold" signal onto its hold line in control bus 106 which, in essence, tells cache controller 40 that more data is potentially on the way and not to release its system bus connection. Cache controller 40' further determines whether the corresponding data in cache data store 26' is dirty or not. If it is found to be dirty, it then causes the addressed "dirty" data in cache data store 26' to be placed onto data bus 102. Data bus interface 50 captures that data and feeds it to cache data store 26 for storage. Additionally, cache controller 40' sets a "bus shared" line on control bus 106 which indicates that the newly stored data in cache data store 26 is present in more than one location. (Obviously, if cache controller 40' had found that its data was not dirty, then no transmission to cache data store 26 would have been necessary as the data in cache data store 26' would have been identical to that being read from main memory 14).

When cache controller 40' sets the "bus shared" line to the one state, cache controller 40 also sets a shared bit in shared register 32 (which corresponds to the data just read into cache data store 26) to the one state.

Assuming now that data is to be read from a cache data store into main memory 14, such a data transfer is, as aforestated, monitored by non-associated cache controllers. (i.e., those controllers which control cache data stores other than the cache data store from which data is being read). Thus, if cache controller 40' senses a write command generated by cache controller 40 onto control bus 48, it instructs address bus interface 52' and data bus interface 50' to latch the address and data being written to main memory 14. Subsequently, a tag comparison is performed to determine if any of the tags in bus monitor cache tag store 54' are equal to the tag stored in address bus interface 52'. If so, then cache controller 40' instructs data bus interface 50' to update cache data store 26' with the new data.

Returning now to FIG. 3, the decision tree shown therein indicates that on a CPU read request, if a "cache miss", "dirty" and "not shared" sequence of findings occur, the operation is the same as when "shared" data is found. In other words whether the data is shared or not shared is irrelevant to the sequence of operations.

If however, a cache miss occurs and the data is found to be not dirty, (and shared or not shared) the sequence of operations is altered. In such a case, a main memory read request is generated by cache controller 40 to memory control unit 54 and the main memory data is written into cache data store 26. Since data at the addressed position of cache data store 26 is "not dirty" there is no need to update the identical data appearing in main memory 14. The "bus shared" line is then sampled and the shared bit is set in accordance with whether another cache controller, in response to the read request appearing on the control bus, has set the shared line to indicate that it too has the same data. Finally, the contents of cache data store 26 are read to CPU 10.

Figure 4:
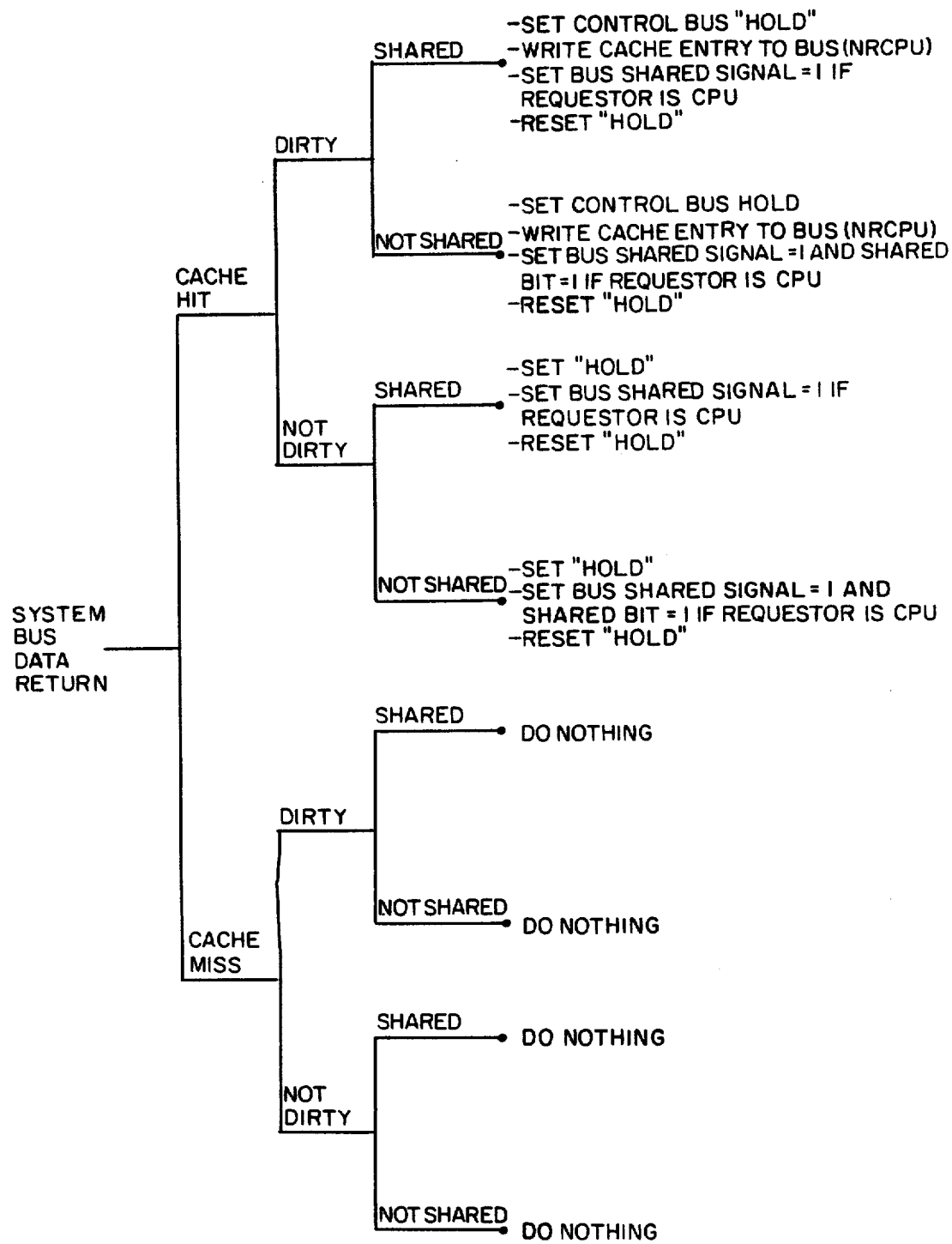
FIG. 4 is a decision tree indicating the sequence of events initiated when a non-requesting CPU/cache monitors on the system bus a data return to a read-requestor.

Turning now to FIG. 4, the decision tree shown therein will be helpful in understanding the operation of the system when a data return indication is monitored on the system bus by a non-requesting cache controller. As above stated, each cache controller monitors the control bus for both data reads from main memory and writes to main memory. In the instance shown in FIG. 4, it is assumed that a read from main memory 14 has been requested by cache controller 40 and that a data return response thereto has been monitored by cache controller 40'. As aforestated, cache controller 40' causes the physical address of the data being accessed to be latched in address bus interface 52'. It then determines if a cache "hit" occurs; whether the data is dirty or not dirty and whether it is shared or not shared. If the conditions hit, dirty and shared are found, cache controller 40' sets its hold line on control bus 106 and instructs cache data store 26' to write its stored data onto data bus 102 where it is picked up and stored in cache data store 26 by data bus interface 50. Cache controller 40' also sets the shared line on control bus 106 equal to one, assuming the requestor of the data is a central processing unit.

If in the case discussed above, cache controller 40' finds that the data indication in shared bit register 32' is "not shared", the process is much the same as in the shared condition however shared bit register 32' is set to one to properly indicate the shared state of the data in cache data store 26'.

If a cache hit is found but the data in cache data store 26' is found to be "not dirty", the following actions occur. If the data is found to be shared, cache controller 40' sets the bus shared line to a one, assuming the requestor is a central processing unit. If the data is found to be "not shared" the bus shared signal is also set to a one and the shared bit associated with the respective data line in cache data store 26' is set to one indicating that the data stored therein is, in fact, shared. Here again, it is assumed the requestor is a central processing unit. As is obvious, if there is a cache miss in this procedure, no actions are required.

Figure 10A:
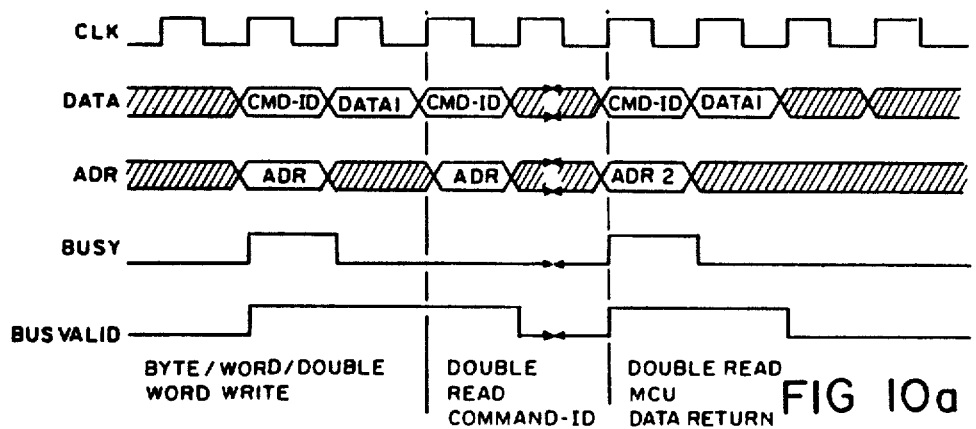
FIGS. 10a, 10b and 10c are timing diagrams useful in understanding the invention.
Figure 10B:
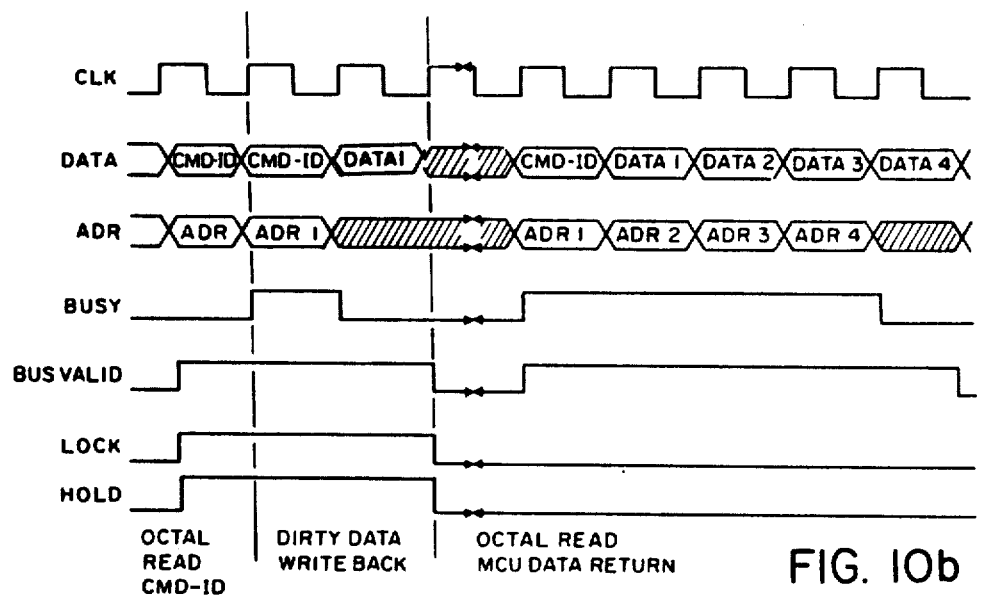
Figure 10C:
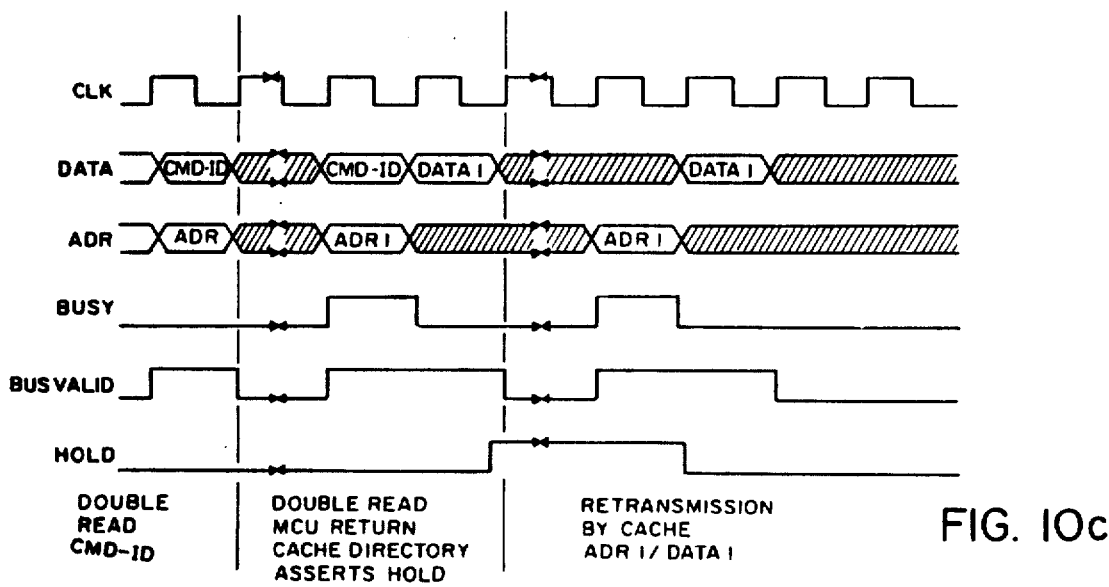

The timing diagrams of FIGS. 10a, 10b and 10c illustrate various types of bus transactions.

FIG. 10a shows a byte/word/double write immediately followed by the Command-ID and address portion of a double (64 bit) read followed by an MCU data return of the requested double word.

FIG. 10b demonstrates the use of both the lock and hold lines for a cache fetch/write back. That case corresponds to when a cache fetch is issued, a miss occurs and dirty data is resident in the addressed position. Thus the dirty data must be written back to main memory prior to the requested data from main memory being written into the cache store. The associated cache controller is shown asserting both its hold line and the lock line and sending command ID to MCU 54 for an octal word read. The asserted hold line prevents MCU 54 from writing into the cache store until it has been released and the asserted lock line prevents another bus connection from using the bus during this sequence Subsequent to the write back, and release of both the hold and lock lines, MCU 54 is free to write the requested four double words to the cache store.

FIG. 10c demonstrates another use of the hold line. A bus connection is shown requesting a double word read and the MCU 54 returning the requested double word. The caches latch the address of the double word, and do directory look-ups in the following cycle. If a dirty match is found by a cache, that cache asserts hold shortly before the end of the cycle. The hold line prevents other connections from using the bus until the write-back cache re-transmits the double word along with its address and thereafter releases. The retransmission is indicated by the assertion of a bus valid signal on the system bus.

Figure 5:
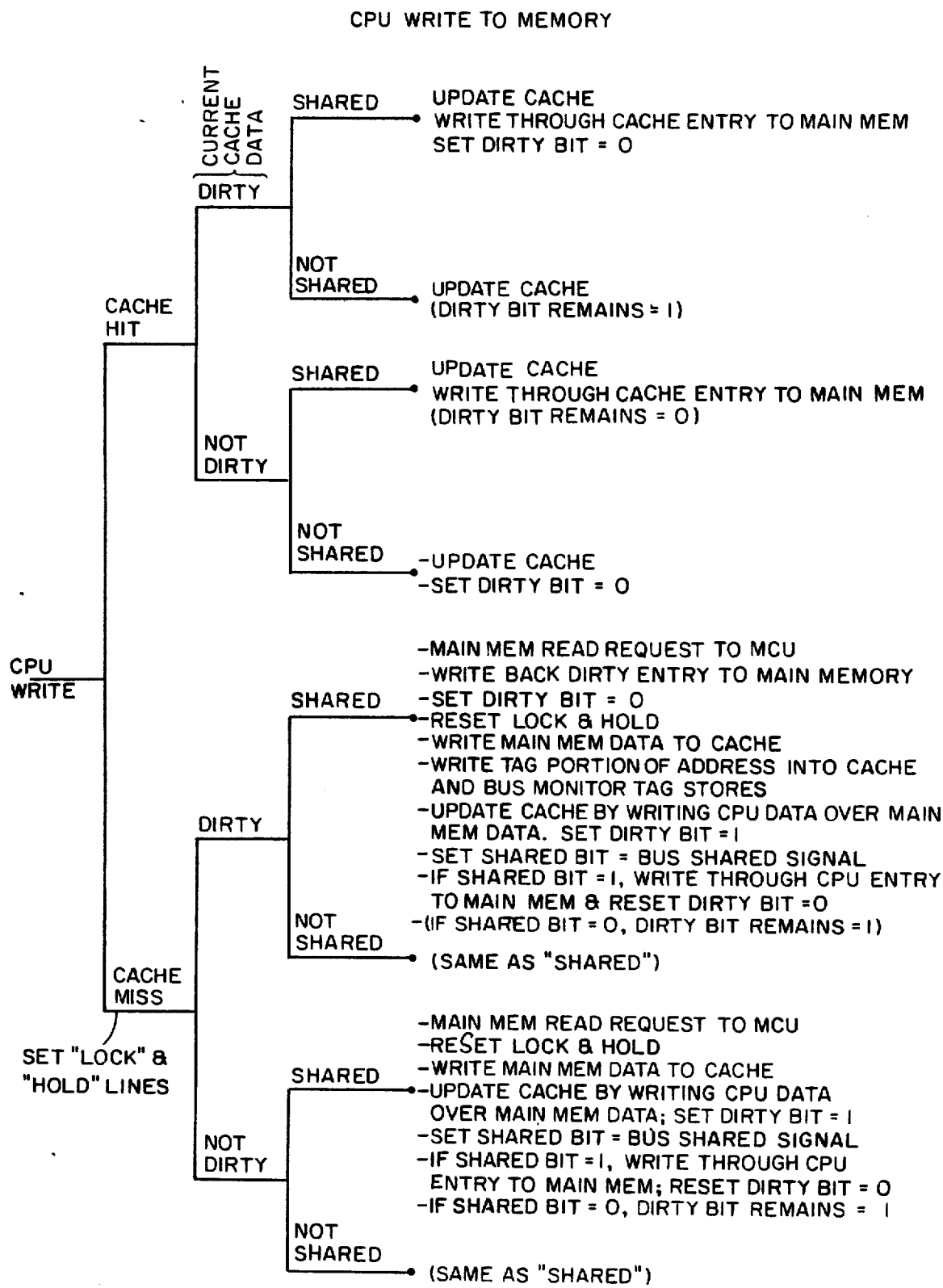
FIG. 5 is a decision tree indicating the sequence of events which occur during a CPU write to memory.

Turning now to FIG. 5, the procedures followed when a write to memory command is received from a CPU will be described. In such a case, the initial operation is much the same as when a read request is received, i.e., the physical address accompanying the write command is analyzed to determine whether the data sought to be written is either present or not present in cache data store 26 (a hit or a miss). If a hit occurs and it is found that the data is dirty and shared, cache controller 40 causes cache data store 26 and cache tag store 28 to store the respective data and tag bits. However, since it was found that the CPU is writing to a shared location, invariably, a write through action occurs to main memory 14. Thus the data, in addition to being written into cache data store 26, is also written to main memory 14 via a write command placed on control bus 106.

Assuming the shared data is still resident in cache data store 26', the write through is sensed by cache controller 40' which determines that its cache data store 26' includes data having the same tag. Cache controller 40' then instructs data bus interface 50' to update that data position with the data being written from cache data store 26 to main memory 14. (which has been captured by address bus and data bus interfaces 52' and 50' respectively). This assures that each of the cache data stores has the most updated information. Since the main memory data and the cache data stores now contain the same information, the dirty bit is reset to 0.

If it is found that the data being written to main memory is not shared, all that is required is that the cache data store 26 be updated. Note that the dirty bit remains equal to one as the data still is not the same as that stored in main memory 14, as no write through to main memory has occurred.

If there is a cache hit and not dirty and shared indications are found, the operation is identical to that for the "cache hit", "dirty", and "shared". If the data is found to be not shared, then the cache is updated and the dirty bit is again set to one as the data in cache data store 26 differs from the data stored at the same memory position in main memory 14.

IF a CPU write to memory command is received and a cache miss is found but with a dirty indication for the data already stored in the particular addressed position within cache data store 26, then a considerably more complex set of steps take place. This is irrespective of whether the data is shared or not shared. First, the main memory read request is transmitted to memory control unit 54 by cache controller 40. Then, the dirty entry in cache data store 26 is written into main memory 14. The actual data being sought to be modified is written from main memory 14 back into cache data store 26 and the cache tag store and bus monitor cache tag store are updated. The new data on cache data store 26 is then updated by the act of CPU 10 overwriting new data in the same data position. (It should be recalled that the system retains the capability to selectively overwrite a full double word, single word or any combination of bytes.) Since a write to memory signal was sensed on control bus 106, if another cache controller finds that it too has, in its associated cache data store, the data being accessed, it will set the "bus shared" line on control bus 106 indicating shared data. The bus shared signal is sensed by cache controller 40 and the shared bit in shared bit register 32 is set to one. Furthermore, the data recently written into cache data store 26 by CPU 10 is also written through into main memory 14 and thus is sensed by cache controller 40' so that it may modify its associated cache data store. The dirty bit is then reset to 0 in dirty bit register 30. Obviously, if the bus shared signal is equal to 0, there is no need to write through the CPU entry to main memory 14. As shown by the lower branches of the decision tree in FIG. 5, the operations are the same whether the data is initially indicated as being shared or not shared.

If, in response to a CPU write signal, cache miss, not dirty and shared (or not shared) indications are found, the operation is much the same as with the "dirty" instance, however, there is no need to update main memory with the "not dirty" entry as it contains the same data.

Figure 6:
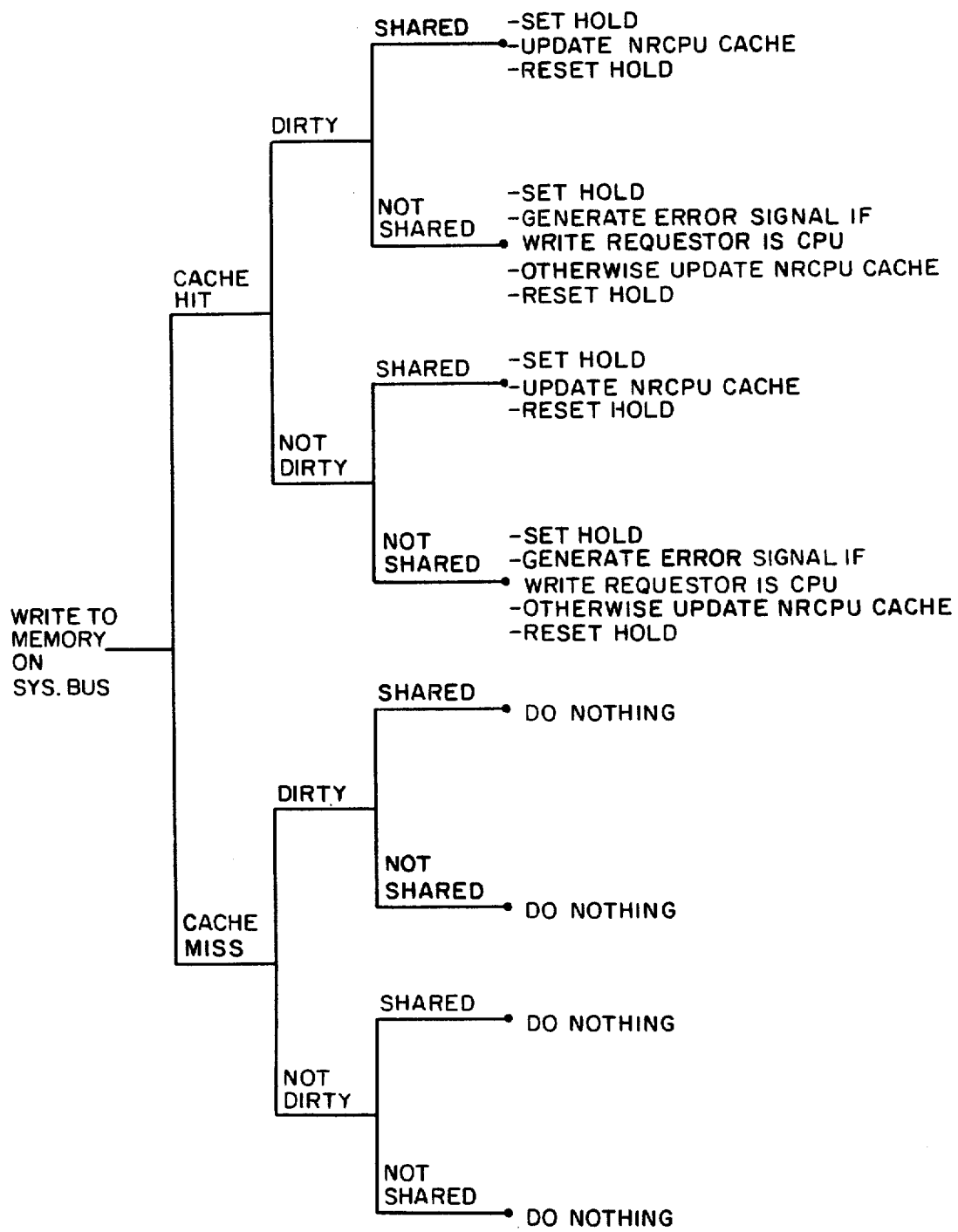
FIG. 6 is a decision tree which indicates the sequence of events which occur when a non-requesting CPU/cache monitors a write to memory by a write requestor.

Turning now to FIG. 6, the decision tree shown therein illustrates the various system actions in response to a write to memory being sensed on the system bus. If the non-requesting CPU/cache system finds that the data being written to memory from another CPU/cache system or I/O interface is found in its associated cache data store, and it is indicated as being shared, then it merely updates its cache to coincide with the new data being written to memory. In the not shared cases indicated for a cache hit, there is an error state sensed if the same data is found in a cache data store which is being written to memory from another cache data store. In all cases, the cache data store is updated in accordance with the data being written to memory.

What has been discussed to this point has involved, in the main, double word accesses from memory and double word writes to memory. As illustrated in FIG. 1 however, the data format employed by the system shown in FIG. 2 includes two, 4 byte words per line of cache data storage. In many instances, it is not only of interest to read or write both data words, but it is also beneficial to read or write multiples of double words in a single operation without having to perform individual stores or writes for each double word. This is particularly useful when accessing or writing instruction sets or operating on long character strings.

To handle multi-double word operations, a status register is provided. Thus, as shown in FIG. 2, each of cache controllers 40 and 40' is provided with multi word status registers 90 and 90' respectively. These status registers are employed during multi word transfers.

Figure 7:
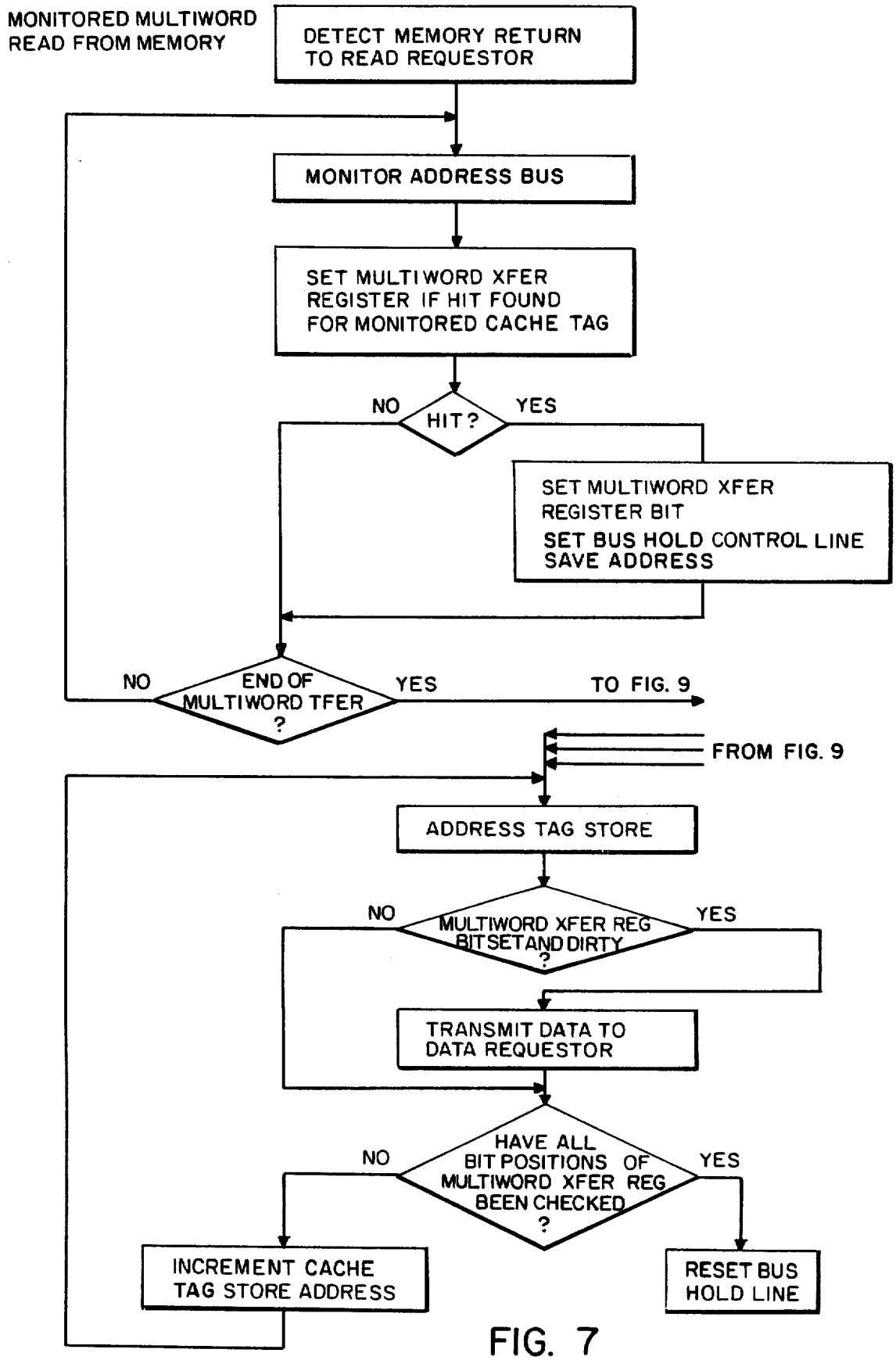
FIG. 7 is a flow chart indicating the sequence of events which occurs when a non-requesting CPU/cache monitors a multi-word read from memory to a requesting CPU/cache.

Referring to FIG. 7, a flow diagram is illustrated which illustrates the occurrences when a multi word data transfer appears on system bus 42 and is monitored by a cache controller other than the one which issued the multi word read request. Each cache controller continuously monitors the system bus for a multi word transfer. During a data return, a cache controller may detect that a data word being transferred has the same tag as a tag stored in its associated bus monitor cache tag store. The cache controller sets in its associated multi word transfer register a one bit in a position which corresponds to the address of the cache tag which evidenced the hit indication. Similarly the cache controller upon detecting the first "hit" in multi-word transfer, sets its bus hold control line which notifies the cache controller receiving the data that it should expect additional data.

The cache controller continues to monitor the system bus until the multi-word transfer has ended. At such time (assuming that cache controller 40' has been monitoring the bus), multi word register 90' has stored therein a series of zeros and ones, with the ones in positions corresponding to addresses of the cache tags where a hit indication occurred.

The cache controller then addresses its tag store at the address indicated by the first hit. If the data stored at that address is indicated as dirty, it is transmitted to the data requestor. If the data is found to be not dirty, the next address is accessed and the process repeated until all addresses corresponding to positions of the multi-word transfer register with one bits, have been examined.

Subsequently, cache controller 40' causes the data which is dirty and corresponds to the ones in multi word transfer register 90', to be transmitted to the interface units associated with the cache controller 40 for storage in cache data store 26.

Figure 8:
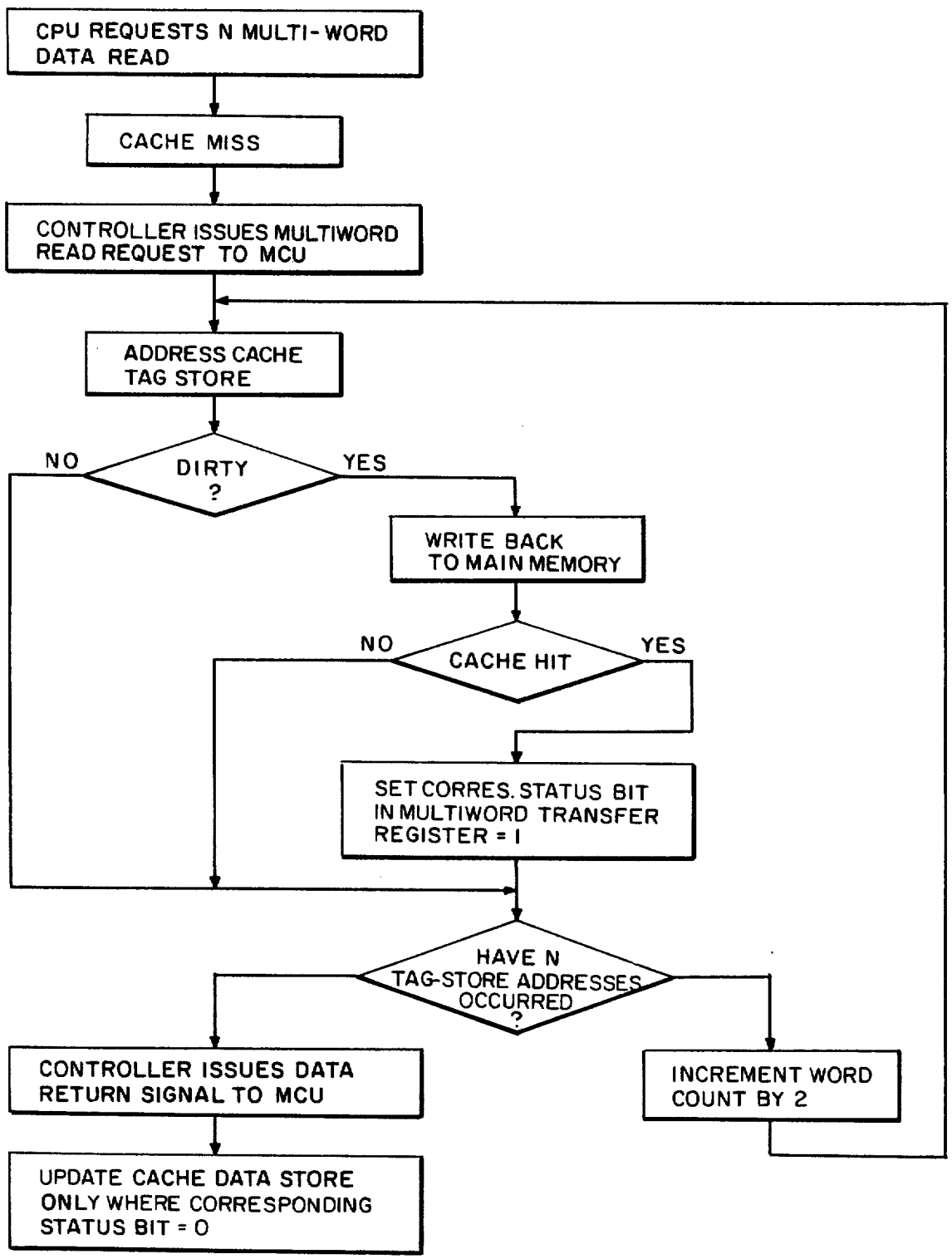
FIG. 8 is a flow chart illustrating a multi word data read from memory.

Turning now to FIG. 8, a flow diagram illustrating an N multi-word data read from memory is illustrated. Initially, a CPU requests a multi word data read from its associated cache. e.g. CPU 10 issues to cache controller 40 via line 80 a multi word data request. However, the initial cache tag requested is found not to be contained in cache data store 26 (a miss). Controller 40 then issues a multi word instruction request to memory control unit 54. Before the actual data transfer occurs the memory position to receive the first double word in cache tag store 26 is addressed. The dirty bit corresponding to the data presently at that address is examined to see if it is set to a one. If it is not, it does not need to be written back to main memory and a corresponding status bit in multi word transfer register remains at 0 indicating that that position may be overwritten. If it is set to one, it must be written back to main memory for update purposes before it may be overwritten.

After either a write back or a finding that a write back is not necessary, the cache tag store is addressed. If there is a hit, a corresponding status bit in multi word transfer register 90 is set equal to one. Subsequently, until N tag store addresses have occurred, the process repeats itself until all N double words have been examined. Then, controller 40 allows a data return from memory control unit 54 which reads out the N words onto data bus 102 where they are captured by data bus interface 50. Multi word transfer register 90 then comes into play and controls which positions in cache data store 26 are updated. (i.e., only positions corresponding to the positions of multi word register 90 which are set to 0). In this manner, not only is the dirty data written back to main memory and main memory completely updated, but also that data received from main memory 14, which is not most current, is inhibited from being stored in the cache data store.

Figure 9:
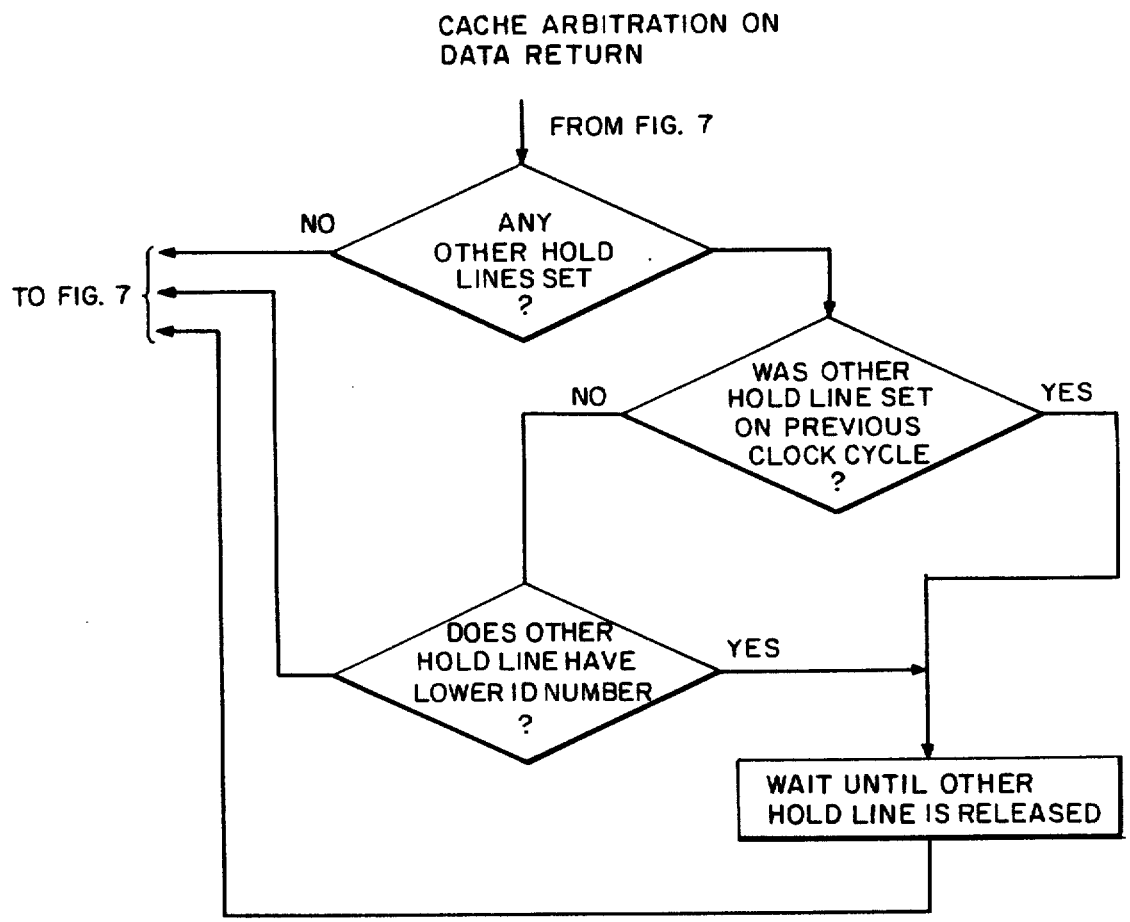
FIG. 9 is a flow chart illustrating the arbitration which occurs between caches on a data return.

Under certain circumstances, conflicts may occur between cache memories. One such conflict may arise during a data return from main memory to a requestor which is monitored by two or more caches. If those caches register hits for the data unit (or units) being returned from main memory, each will set its respective hold line before it has had a chance to examine the dirty status for data at the monitored address. To prevent a conflict, the procedure shown in FIG. 9 is employed. In sum, each cache controller determines if the others hold line was set on a previous clock cycle. If so the earlier set hold line dominates. If both hold lines were set during the same clock cycle, then the cache controller associated with the CPU bearing the lower identification number takes precedence.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A data processing system including one or more central processing units, main memory means, and bus means, for each central processing unit the invention comprising:

cache memory means coupled between the central processing unit and said bus means;

bus monitor means associated with said cache memory means and coupled to said bus means for detecting on said bus means an address associated with a data unit transferred from said main memory means to a bus connection requesting the data unit;

means coupled to said cache memory means and to said bus means for determining if data having the same address as said transferred data unit is present in said cache memory means and, if present, for asserting a hold signal on said bus means, the assertion of the hold signal indicating at least to the bus connection requesting the data unit that another data unit may be transmitted over said bus means; and means for detecting whether data corresponding to the address of said transferred data unit and determined to be stored in said cache memory means may be different in content from said transferred data unit and, if so, transmitting said data from said cache memory means to said bus means for reception by the bus connection requesting the data unit.

2. The invention as defined in claim 1 wherein said bus connection requesting the data unit, in response to sensing the assertion of said hold signal, maintains an interaction with said bus means so that the bus connection requesting the data unit may receive said different content data from said cache memory means.

3. The invention as defined in claim 2 and further comprising:
   a multi-data unit transfer register; and
   means coupled to said bus means and responsive thereto for detecting a multi-data unit read onto said bus means from said main memory means and for determining if any said data unit is present in said cache memory means; said detecting means further including means for recording an indication of such presence in said multi-data unit transfer register and causing said hold line to be asserted.

4. The invention as defined in claim 3 and further including means for transferring from said cache memory means to the recipient of said multi-data unit transfer each said data unit indicated by said multi-data unit transfer register as being present and which is also determined to be dirty.

5. A data processing system including at least first and second central processing units, main memory means, and bus means, the invention comprising:
   at least first and second cache memory means respectively coupled between said first and second central processing units and said bus means;
   bus monitor means associated with each said cache memory means respectively and coupled to said bus means for detecting on said bus means an address associated with a data unit being read from said main memory means;
   means coupled to said associated cache memory means and to said bus means for determining if said corresponding to said address as detected by said bus monitor means is present in the associated cache memory means and, if said data is found to be present, for asserting a first hold signal on said bus means, the assertion of the first hold signal indicating at least to a bus connection reading the data unit that another data unit may be transmitted over said bus means; and
   means for detecting whether the data corresponding to said address and stored in said associated cache memory means may be different in content from that detected as being read and, if the data is determined to possibly be different in content, transmitting said data from said associated cache memory means to the bus connection reading the data unit from said main memory.

6. The invention as claimed in claim 5 wherein each said cache memory means comprises a cache data store, a cache tag store, a shared bit store and bus monitor cache tag store.

7. The invention as claimed in claim 6 wherein said bus monitor means captures the physical address of said data from said bus means and provides the cache address and cache tag portions thereof to said determining means.

8. The invention as claimed in claim 7 wherein said determining means compares said cache tag from said bus monitor means with a cache tag stored in its associated bus monitor cache tag store at said cache address provided by said bus monitoring means to determine if said cache tags are identical.

9. The invention as claimed in claim 8, wherein said detecting means includes a dirty bit store.

10. The invention as defined in claim 5 and further comprising for each said cache memory means:
    a multi-data unit transfer register; and
    means coupled to said bus means and responsive thereto for detecting a multi-data unit read on said bus means from said main memory means and for determining if any said data unit is present in said cache memory means; said detecting means further including means for recording an indication of such presence in said multi-data unit transfer register and causing said hold line to be asserted.

11. The invention as defined in claim 10 and further including means for transferring from said associated cache memory means to the recipient of said multi-data unit transfer each said data unit indicated by said associated multi-data unit transfer register as being present and which is also determined to be dirty.

12. The invention as defined in claim 5 wherein said determining means includes means coupled to said bus means for monitoring said bus means for sensing the presence of the assertion of a second hold signal thereon and for determining priority between the first hold signal and the second hold signal.

13. The invention as defined in claim 12 wherein said detecting means is coupled to said monitoring means and is responsive thereto for transmitting said data from said associated cache memory means in accordance with the priority determination of said monitoring means.

14. In a data processing system comprising at least one central processing unit having a cache memory coupled to a system memory through a system bus, the system bus including signal lines for conveying, during bus cycles, address information and data units associated with addresses between the system memory and other bus connections coupled to the system bus, the cache memory comprising:
    means for monitoring bus transactions occurring on the system bus for determining if a bus transaction occurring during a current bus cycle is an operation initiated by another bus connection that reads one or more data units from an address of the system memory;
    means for detecting if the address is associated with one or more data units already stored within the cache memory; and
    means having an input coupled to said detecting means and responsive thereto and further having an output coupled to the system bus for asserting thereon during the current bus cycle a HOLD signal line, the assertion of the HOLD signal line indicating to the bus connection initiating the read operation that at least one of the data units associated with the address is stored within the cache memory and that the cache memory will, if the data unit is determined to be marked as dirty within the cache memory, transmit the stored data unit to the bus connection during a subsequent bus cycle.

15. A cache memory as set forth in claim 14 and further comprising:
    a multi-data unit transfer register; and
    means coupled to the system bus and responsive thereto for detecting an occurrence of a multi-data unit read operation and for determining if any data unit read by the multi-data unit read operation is stored in the cache memory, the multi-data unit read operation detecting means further including means for recording in the multi-data unit transfer register an indication that the data unit is stored within the cache memory and further comprising means, coupled to the asserting means, for causing the HOLD signal line to be asserted.

16. A cache memory as set forth in claim 14 wherein each cache memory is coupled to an associated HOLD signal line for asserting same and wherein said monitoring means includes means for sensing an assertion of another HOLD signal line and further includes means for determining priority between an assertion of the associated HOLD signal line and an assertion of another HOLD signal line.

* * * * *

UNITED STATES PATENT AND TRADEMARK OFFICE
CERTIFICATE OF CORRECTION

PATENT NO. : 4,939,641

DATED : July 3, 1990

INVENTOR(S) : Schwartz et al.

It is certified that error appears in the above-identified patent and that said Letters Patent is hereby corrected as shown below:

Claim 5, Col. 13, line 33, delete "said" (second occurrence) and insert --data--.

Signed and Sealed this

Twenty-fifth Day of June, 1991

Attest:

*Attesting Officer*

HARRY F. MANBECK, JR.

*Commissioner of Patents and Trademarks*